(12) United States Patent
Willis et al.

(10) Patent No.: US 7,971,603 B2
(45) Date of Patent: Jul. 5, 2011

(54) HEADER FOR A HEAT EXCHANGER

(75) Inventors: Vance Elliot Willis, Nashville, TN (US);
Michael Damion Mercer, Nashville, TN (US)

(73) Assignee: Hayward Industries, Inc., Elizabeth, NJ (US)

( * ) Notice: Subject to any disclaimer, the term of this patent is extended or adjusted under 35 U.S.C. 154(b) by 1168 days.

(21) Appl. No.: 11/698,792

(22) Filed: Jan. 26, 2007

(65) Prior Publication Data
US 2008/0179051 A1    Jul. 31, 2008

(51) Int. Cl.
*F16K 17/04* (2006.01)
(52) U.S. Cl. .............. 137/454.6; 137/512.1; 137/599.14
(58) Field of Classification Search ............... 137/512.1, 137/512.15, 599.11, 599.14, 454.6
See application file for complete search history.

(56) References Cited

U.S. PATENT DOCUMENTS

| | | | |
|---|---|---|---|
| 176,964 A | 5/1876 | Johnson | |
| 556,630 A | 3/1896 | Hoberecht | |
| 753,250 A | 3/1904 | Ebinger | |
| 1,742,362 A | 1/1930 | Ludt | |
| 2,042,812 A | 6/1936 | Tull et al. | |
| 2,259,433 A | 10/1941 | Kitto | |
| 3,227,175 A * | 1/1966 | Remington et al. | 137/599.08 |
| 3,568,764 A | 3/1971 | Newman et al. | |
| 3,828,575 A | 8/1974 | Malcosky et al. | |
| 3,840,175 A | 10/1974 | Jacuzzi | |
| 3,976,129 A | 8/1976 | Silver | |
| 4,147,182 A * | 4/1979 | Akerblom | 137/625.17 |
| 4,257,479 A | 3/1981 | Newton | |
| 4,266,604 A | 5/1981 | Sumikawa et al. | |
| 4,299,098 A | 11/1981 | Derosier | |
| D264,500 S | 5/1982 | Beaton | |
| D265,236 S | 6/1982 | Yamin | |
| 4,456,059 A | 6/1984 | Cadars | |
| 4,538,418 A | 9/1985 | Lawrence et al. | |
| 4,558,571 A | 12/1985 | Yoshinaga et al. | |
| 4,576,223 A | 3/1986 | Humpolik et al. | |
| 4,588,026 A | 5/1986 | Hapgood | |
| 4,595,825 A | 6/1986 | Gordbegli | |
| 4,856,824 A | 8/1989 | Clausen | |
| 4,907,418 A | 3/1990 | DeFazio | |

(Continued)

FOREIGN PATENT DOCUMENTS

DE     3239950     5/1984

(Continued)

OTHER PUBLICATIONS

Office Action dated Apr. 30, 2009 from related U.S. Appl. No. 11/789,870, filed Apr. 26, 2007 (16 pages).

(Continued)

*Primary Examiner* — John Fox
(74) *Attorney, Agent, or Firm* — McCarter & English, LLP

(57) ABSTRACT

Disclosed herein is a header for a heat exchanger that has an inflow side, an outflow side, a bypass port therebetween, and a pressure-sensitive flapper valve proximal the bypass port. As pressure increases at the inflow side of the header, the flapper valve opens proportionally, and, as pressure decreases at the inflow side, the flapper valve closes proportionally. The flapper valve is preferably included as part of a service cartridge assembly to facilitate easy repair and/or replacement of the flapper valve. In some embodiments of the invention, a differential pressure is measured between the inflow and outflow sides, and activation of the heat exchanger is initiated in response to the differential pressure having exceeded a set point.

22 Claims, 15 Drawing Sheets

U.S. PATENT DOCUMENTS

| | | | |
|---|---|---|---|
| 5,178,211 A | | 1/1993 | Bauer et al. |
| 5,201,307 A | | 4/1993 | Afshar |
| 5,216,743 A | | 6/1993 | Seitz |
| 5,228,618 A | | 7/1993 | Afshar |
| 5,318,007 A | | 6/1994 | Afshar |
| 5,472,010 A | * | 12/1995 | Gonzalez ................. 137/119.08 |
| 5,487,423 A | | 1/1996 | Romero |
| 5,775,267 A | | 7/1998 | Hou et al. |
| D397,191 S | | 8/1998 | Kralovec et al. |
| 5,802,864 A | | 9/1998 | Yarbrough et al. |
| 5,901,563 A | | 5/1999 | Yarbrough et al. |
| 5,906,104 A | | 5/1999 | Schwartz et al. |
| D412,567 S | | 8/1999 | Ward et al. |
| 6,026,804 A | | 2/2000 | Schardt et al. |
| 6,082,993 A | | 7/2000 | O'Leary et al. |
| 6,293,335 B1 | | 9/2001 | Tawney et al. |
| 6,295,980 B1 | | 10/2001 | Lopez et al. |
| 6,321,833 B1 | | 11/2001 | O'Leary et al. |
| 6,499,534 B1 | | 12/2002 | Tawney et al. |
| 6,910,666 B2 | | 6/2005 | Burr |
| 6,920,892 B2 | * | 7/2005 | Agresta et al. ........... 137/119.04 |
| 7,063,133 B2 | | 6/2006 | Gordon et al. |
| D574,938 S | | 8/2008 | Martin et al. |
| 7,527,069 B2 | * | 5/2009 | Denike et al. .............. 137/487.5 |
| 7,543,456 B2 | | 6/2009 | Sinha et al. |
| 7,814,934 B2 | * | 10/2010 | Thelen .......................... 137/597 |
| 2002/0157815 A1 | | 10/2002 | Sutter |
| 2003/0111840 A1 | | 6/2003 | O'Neill et al. |
| 2003/0209345 A1 | | 11/2003 | Zweig |
| 2008/0223561 A1 | | 9/2008 | Li et al. |
| 2008/0264617 A1 | | 10/2008 | Martin et al. |

FOREIGN PATENT DOCUMENTS

| | | |
|---|---|---|
| DE | 3703282 | 8/1988 |
| EP | 0067699 | 12/1982 |
| JP | 60048496 | 3/1985 |

OTHER PUBLICATIONS

Turbotec Brochure (Prior to Jan. 26, 2006) (6 pages).
U.S. Appl. No. 12/017,659, Title: Heat Exchangers and Headers Therefor, filed Jan. 22, 2008 (claiming priority to U.S. Appl. Nos. 11/698,792 and 11/789,870) (134 pages).
U.S. Appl. No. 11/789,870, Title: Heat Exchanger, filed Apr. 26, 2007 (59 pages).
U.S. Appl. No. 29/286,192, Title: Heat Exchanger, filed Apr. 26, 2007 (9 pages).
MiniMax CH Operation and Installation Manual (Rev. C. Jan. 22, 2004) and four photographs (taken prior to Jan. 26, 2007) of a device of the type shown at pp. 7, 11, 19, and A-10 thereof (40 pages).
MiniMax NTTSI, marked © 2005 Pentair Water Pool and Spa, Inc. (2 pages).
Replacement Parts, Raypak Catalog No. 9100.554 (2005) (7 pages).
"Anything But Basic" Raypak Catalog No. 6000.12A, marked © 2004 Raypak, Inc. (4 pages).
Jandy LX/LT Heaters Sell Sheet, marked © 2006 Jandy Pool Products, Inc. (2 pages).
Leers LX/LT Low NOx Parts List, marked Mfg. 2003-Present (2 pages).
Installation and Operation Manual LX and LT Gas-Fired Pool and Spa Heater, marked © Water Pik Technologies 0401 (32 pages).
Notices of Allowance of Apr. 3, 2008 and May 30, 2008 from commonly-owned U.S. Appl. No. 29/286,192 (13 pages).
Office Action issued by the Canadian Intellectual Property Office on Nov. 18, 2009 in connection with related Canadian Application No. 2,619,342 filed Jan. 25, 2008 (2 pages).
Response to the Office Action issued by the Canadian Intellectual Property Office on Nov. 18, 2009 in connection with related Canadian Application No. 2,619,342 (5 pages).
Office Action issued by the Canadian Intellectual Property Office on Aug. 6, 2010 in connection with related Canadian Application No. 2,619,342 (2 pages).
Response to Office Action dated Apr. 30, 2009 issued in connection with related U.S. Appl. No. 11/789,870 (13 pages).
Office Action dated Nov. 9, 2009 issued in connection with related U.S. Appl. No. 11/789,870 (20 pages).
Notice of Abandonment dated Jun. 7, 2010 issued in connection with related U.S. Appl. No. 11/789,870 (2 pages).
Notice of Allowance dated Jul. 26, 2010 issued in connection with related U.S. Appl. No. 12/017,659 (7 pages).
Notice of Abandonment dated Nov. 8, 2010 issued in connection with related U.S. Appl. No. 12/017,659 (1 page).

* cited by examiner

1

HEADER FOR A HEAT EXCHANGER

FIELD OF THE INVENTION

The present invention relates generally to a header for use with a heat exchanger and a fluid circulation line of a recreational body of water. In particular, exemplary embodiments of the invention relate to a header that has means for bypassing the heat exchanger and/or means for initiating activation thereof.

BACKGROUND OF THE INVENTION

It is known in the art to utilize a header as an interface between a heat exchanger and a fluid circulation line of a recreational body of water, such as a swimming pool, spa, etc. The header typically has an inflow side that includes (1) a circulation line inlet that is downstream of the send of a fluid circulation line from the swimming pool, and (2) an exchanger line outlet that is upstream of the heat exchanger. Similarly, the header typically also has an outflow side that includes (1) an exchanger line inlet that is downstream of the heat exchanger, (2) and a circulation line outlet that is upstream of the return of the fluid circulation line.

Although any suitable nature and number of components can be installed along the fluid circulation path, e.g., pumps, filters, etc., it is desirable for the water flow rate through the heat exchanger to be optimized in a desired range. Otherwise, for example, a slower water flow rate through the heat exchanger can cause the heat exchanger to overheat, while a faster water flow rate through the heat exchanger can enhance corrosion and/or erosion.

The water flow rate through the heat exchanger is related to the pressure at the inflow side of the header, and, notwithstanding the desire to optimize water flow rate, it is not uncommon for higher pressures to build-up at the inflow side of the header of the prior art, thereby increasing the water flow rate through the heat exchanger. Such is the case, for example, because the exchanger line outlet of the header typically has a diameter greater than that of the pipes of the heat exchanger. Other potential causes for a high-pressure condition at the inflow side of the header can include, for example, a larger pump installed on the fluid circulation line, etc.

What is needed in the art is a header for a heat exchanger that overcomes the disadvantages and shortcomings of the prior art.

SUMMARY OF THE INVENTION

The present invention overcomes the disadvantages and shortcomings of the prior art discussed above by providing a header having improved means for bypassing a heat exchanger and/or improved means for initiating activation thereof. In an exemplary embodiment of the present invention, the header includes an inflow side, an outflow side, a bypass port therebetween, and a pressure-sensitive flapper valve proximal the bypass port. As pressure increases at the inflow side of the header, the flapper valve opens, and, as the pressure decreases at the inflow side of the header, the flapper valve closes. In some exemplary embodiments of the present invention, the header has a service cartridge assembly that includes a frame and a flapper valve removably secured with respect to the frame, such that the service cartridge can be easily inserted into and/or removed from the header to facilitate easy repair and/or replacement of the flapper valve.

In some exemplary embodiments of the present invention, the header is provided with means for sensing a desired pressure differential across the heat exchanger and initiating heat exchanger activation in response to same. For example, a first pressure sensor is provided in fluid communication with the outflow side of the header to sense a first pressure thereof and a second pressure sensor is provided in fluid communication with the inflow side of the header to sense a second pressure thereof. A water flow rate is derived from the differential pressure between the outflow pressure and inflow pressure, and electromechanical and/or electronic means can be utilized to compare the water flow rate against a lower limit associated with the heat exchanger. Initiation of heat exchanger activation occurs when the measured flow rate has risen to meet and/or exceed the lower limit.

Additional features, functions and benefits of the disclosed header and header-related systems will be apparent from the detailed description which follows, particularly when read in conjunction with the accompanying figures.

BRIEF DESCRIPTION OF THE DRAWINGS

For a more complete understanding of the present invention, reference is made to the following detailed description of exemplary embodiment(s) considered in conjunction with the accompanying drawings, in which.

DETAILED DESCRIPTION OF THE EXEMPLARY EMBODIMENTS

Figure 1:
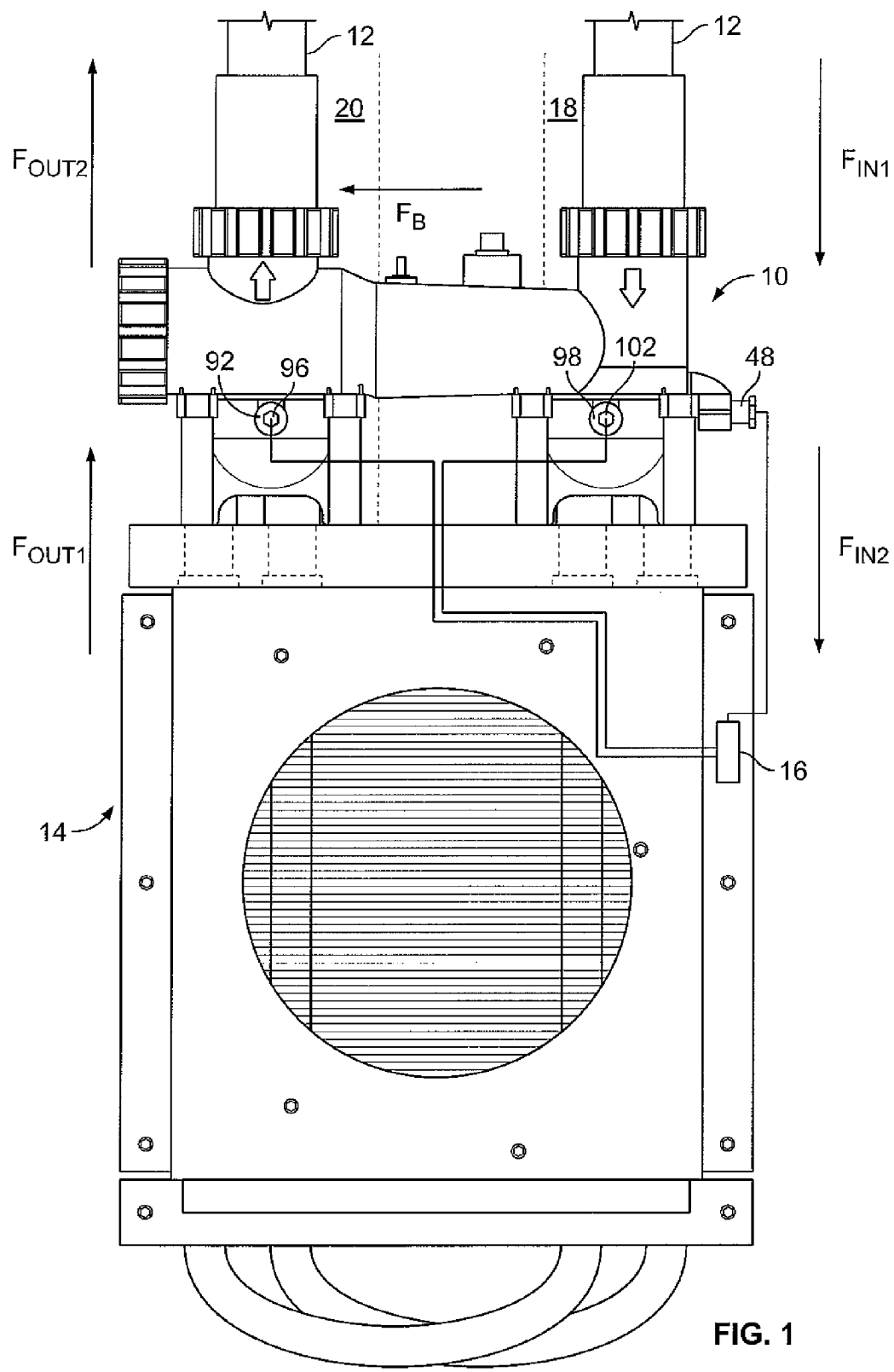
FIG. 1 is a plan view showing a header constructed in accordance with an exemplary embodiment of the present invention, the header being shown in combination with a fluid circulation line of a swimming pool and a heat exchanger having an electrical control system.

Referring to FIG. 1, a header 10 is shown constructed in accordance with an exemplary embodiment of the present invention. The header 10 is in fluid communication with a fluid circulation line 12 of a recreational body of water, such as a swimming pool, spa, etc. A pump (not shown) is typically provided along the fluid circulation line 12 for pumping water therethrough, and filter(s) and/or strainer(s) (not shown) are generally provided along the fluid circulation line 12 for filtering/straining water upstream from the header 10.

The header 10 is provided in fluid communication with a heat exchanger 14, such as the sinusoidal fin-type heat exchanger disclosed in commonly assigned U.S. Pat. No. 6,321,833, the contents of which are hereby incorporated by reference in their entirety. However, any suitable heat exchanger can be provided. An electrical control system 16 is provided for managing activation and/or deactivation of the heat exchanger 14 in accordance with sensed conditions, e.g., pressure and/or temperature, within the header 10. Exemplary control systems may include programmed circuit boards and/or other electronic/electrical system(s). Also, it is contemplated that the electrical control systems can be structurally integrated with the heat exchanger 10 and/or structural separate therefrom.

To facilitate further discussion and consideration of the header 10, exemplary water flow thereto and therefrom has been designated as follows: water flow from the fluid circulation line 12 to an inflow side 18 of the header 10 has been designated as flow path $F_{IN1}$; water flow from the inflow side 18 to the heat exchanger 14 has been designated as flow path $F_{IN2}$; water flow from the heat exchanger 14 to an outflow side 20 of the header 10 has been designated as flow path $F_{OUT1}$; and water flow from the outflow side 20 to the fluid circulation line 12 has been designated as a flow path $F_{OUT2}$. The header 10 facilitates bypass of the heat exchanger 14, e.g. under high pressure conditions, and, to facilitate further consideration and discussion of same below, an exemplary bypass flow has been designated in FIG. 1 as flow path $F_B$.

Figure 2:
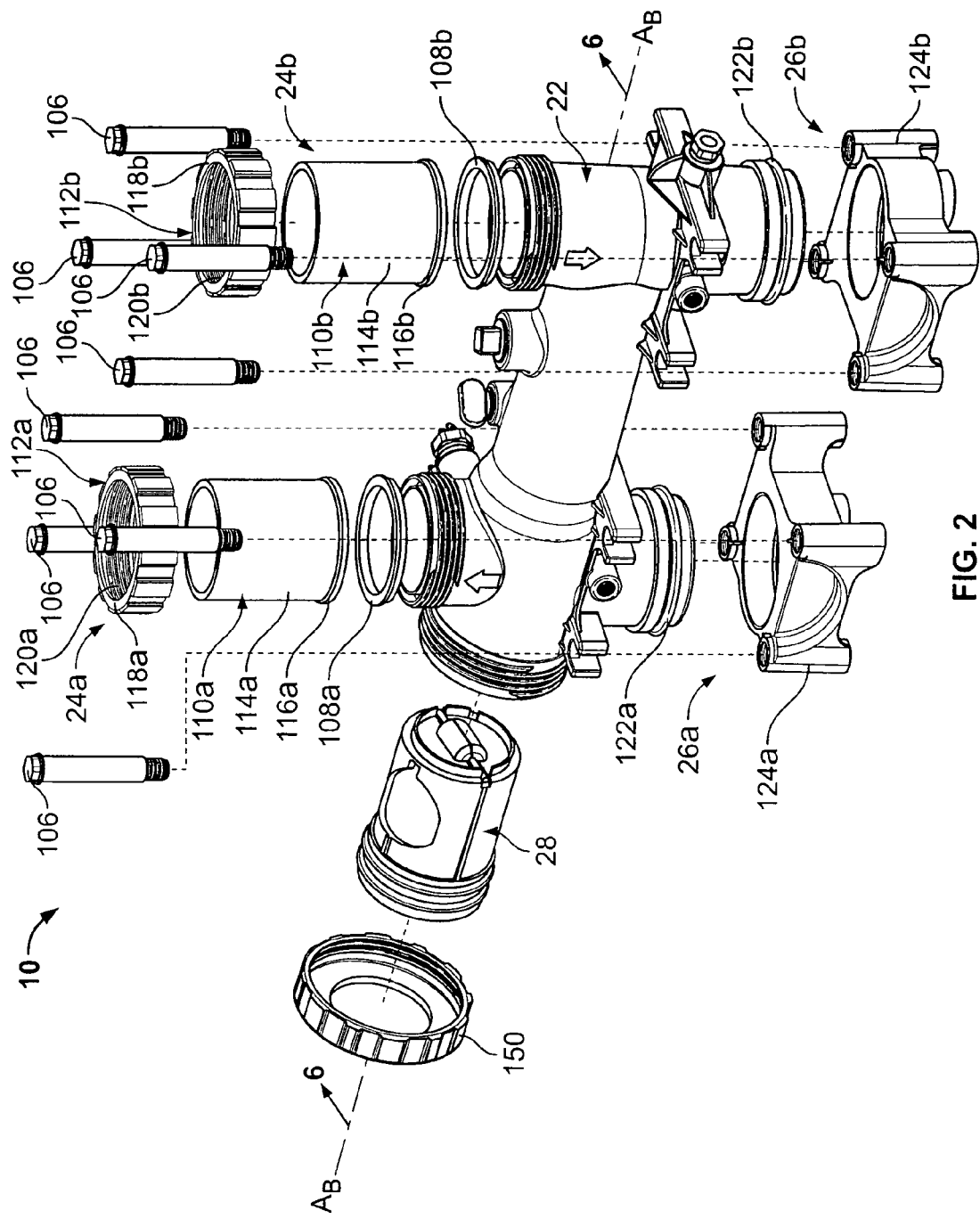
FIG. 2 is an exploded perspective view of the header of FIG. 1, the header being shown to include a manifold, a service cartridge assembly and lock ring therefor, a plurality of circulation line adapter assemblies, a plurality of exchanger line adapter assemblies, and a plurality of bolts.

Referring to FIG. 2, the header 10 includes a manifold 22, a plurality of circulation line adapter assemblies 24a, 24b, a plurality of exchanger line adapter assemblies 26a, 26b, and a service cartridge assembly 28. Each of the manifold 22, the circulation line adapter assemblies 24a, 24b, the exchanger line adapter assemblies 26a, 26b, and the service cartridge assembly 28 shall be discussed below with further detail.

Referring to FIGS. 2-6, the manifold 22 is preferably an integrated (one-piece) structure. As disclosed in commonly assigned U.S. Pat. No. 6,026,804, the contents of which are hereby incorporated by reference in their entirety, the manifold 22 is preferably formed from plastic due to economy of materials and corrosion resistance.

At the inflow side 18, the manifold 22 includes a substantially cylindrical wall 30 that extends about a central axis, referenced herein as an inflow axis $A_{IN}$. A bypass opening 32 is formed transversely in the substantially cylindrical wall 30 in alignment with a midpoint of the inflow axis $A_{IN}$. The bypass opening 32 has a central axis, referenced herein as a bypass axis $A_B$, which extends perpendicularly with respect to the inflow axis $A_{IN}$. An inlet, referenced herein as a circulation line inlet 34, is formed at an end of the substantially cylindrical wall 30. The circulation line inlet 34 defines therein a first inflow chamber 36 and is provided with external threads 38. An annular groove 40 is formed within the circulation line inlet 34 at a terminus thereof.

An outlet, referenced herein as an exchanger line outlet 42, is formed at an end of the substantially cylindrical wall 30 opposite the circulation line inlet 34. The exchanger line outlet 42 defines therein a second inflow chamber 44 and is provided with an annular rim 46 spaced from a terminus of the exchanger line outlet 42 opposite the circulation line inlet 34.

Referring to FIGS. 1, 3-4, and 6, a temperature sensor 48 is preferably provided in fluid communication with the second inflow chamber 44 and in electrical communication with the electrical control system 16 of FIG. 1. The temperature sensor 48 is configured to sense a temperature of the water in the flow path $F_{IN2}$ and send a corresponding temperature measurement to the electrical control system 16. Should the water temperature along flow path $F_{IN2}$ be lower than desired, the electrical control system 16 will activate the heat exchanger 14.

Referring to FIGS. 2-6, the manifold 22 preferably includes a substantially annular bypass port 50 that extends from the substantially cylindrical wall 30 about the bypass axis $A_B$. The bypass port 50 defines a chamber therein, which is referenced herein as a bypass chamber 52, and which is in fluid communication with first and second inflow chambers 36, 44 via the bypass opening 32. The bypass port 50 has an inner radius, which is designated as radius $R_1$ in FIG. 6. It is preferably that the radius $R_1$ be substantially similar, e.g., about equal, to a radius of the cylindrical wall 30 (not designated) to increase potential flow along path $F_B$.

The bypass port 50 preferably has a drain opening (not designated) formed therein that receives a drain plug 54 for manual release of fluid from the bypass chamber 52. Also, the bypass port 50 preferably has an opening (not designated) formed therein for receiving a stop plug 56. It is contemplated that a user of the header 10 can replace the stop plug 56 with a pressure relief valve for exhausting pressurized fluid from the bypass port 50 that exceeds a set point of the pressure relief valve.

At the outflow side 20, the manifold 22 includes an annular housing 58 that is aligned with the bypass axis $A_B$. The annular housing 58 extends axially from the bypass port 50 and, as further discussed below, is partially concentric therewith. The annular housing 58 defines a chamber therein, which is referenced herein as a receiving area 60 and which is sized and shaped to have the service cartridge assembly 28 inserted therein. The receiving area 60 has an inner radius, which is designated as radius $R_2$ in FIG. 6, and which is greater than the inner radius $R_1$ of the bypass port 50.

A service opening 62 is defined by the annular housing 58 at an end thereof opposite the bypass port 50, and the annular housing 58 is provided with external threads 64 proximal the service opening 62. The annular housing 58 has formed therein a plurality of openings, referenced herein as outflow openings 66a, 66b, which are partially aligned along an outflow axis $A_{OUT}$ perpendicular with respect to the bypass axis $A_B$ and parallel with respect to the inflow axis $A_{IN}$. Each one of the outflow openings 66a, 66b is preferably circumferentially-spaced from each other one of the outflow openings 66a, 66b by about one-hundred and eighty degrees (180°).

Figure 5:
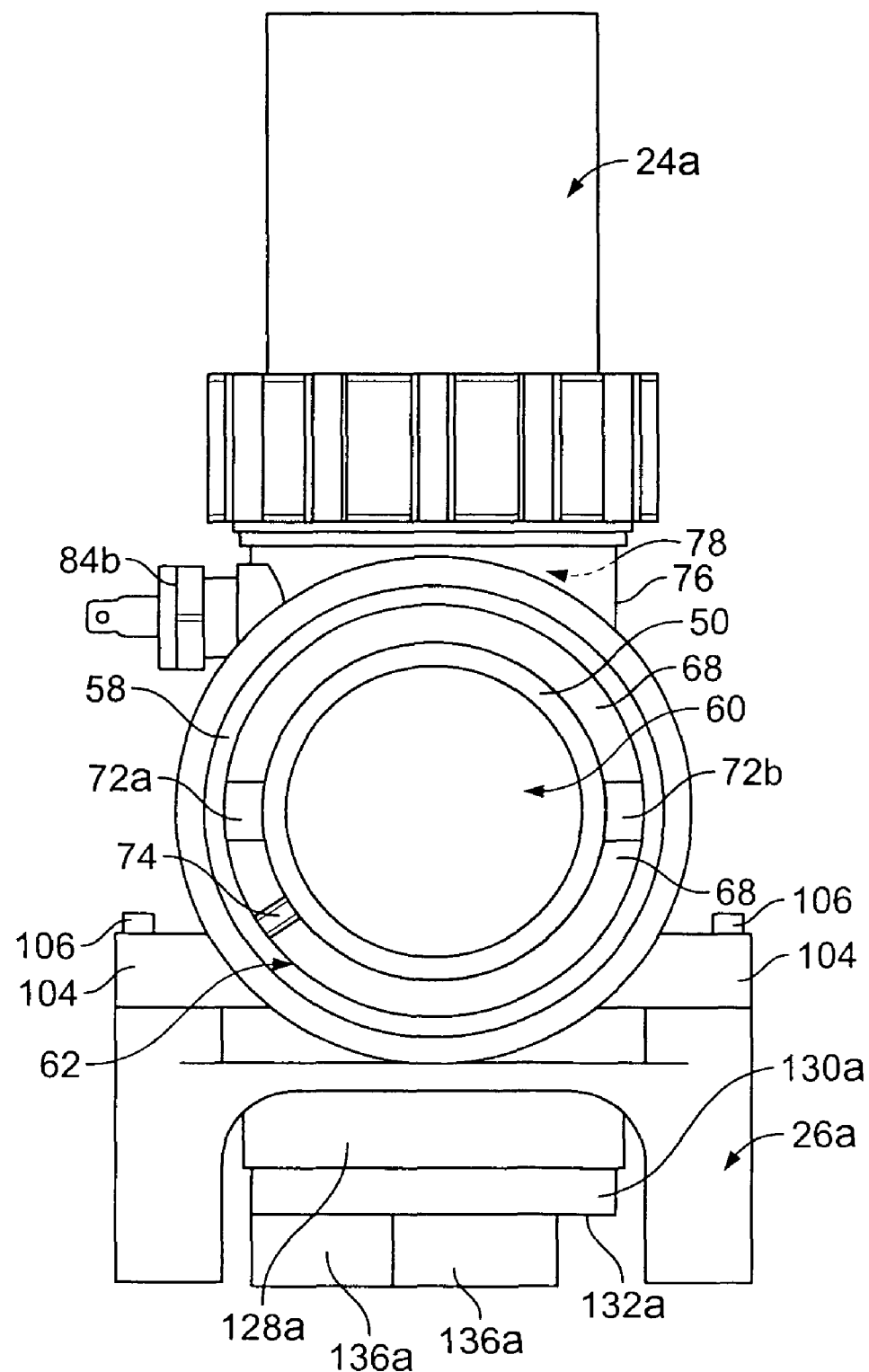
FIG. 5 is a left elevational view showing the header of FIG. 2 with the service cartridge and lock ring therefor having been removed.
Figure 6:
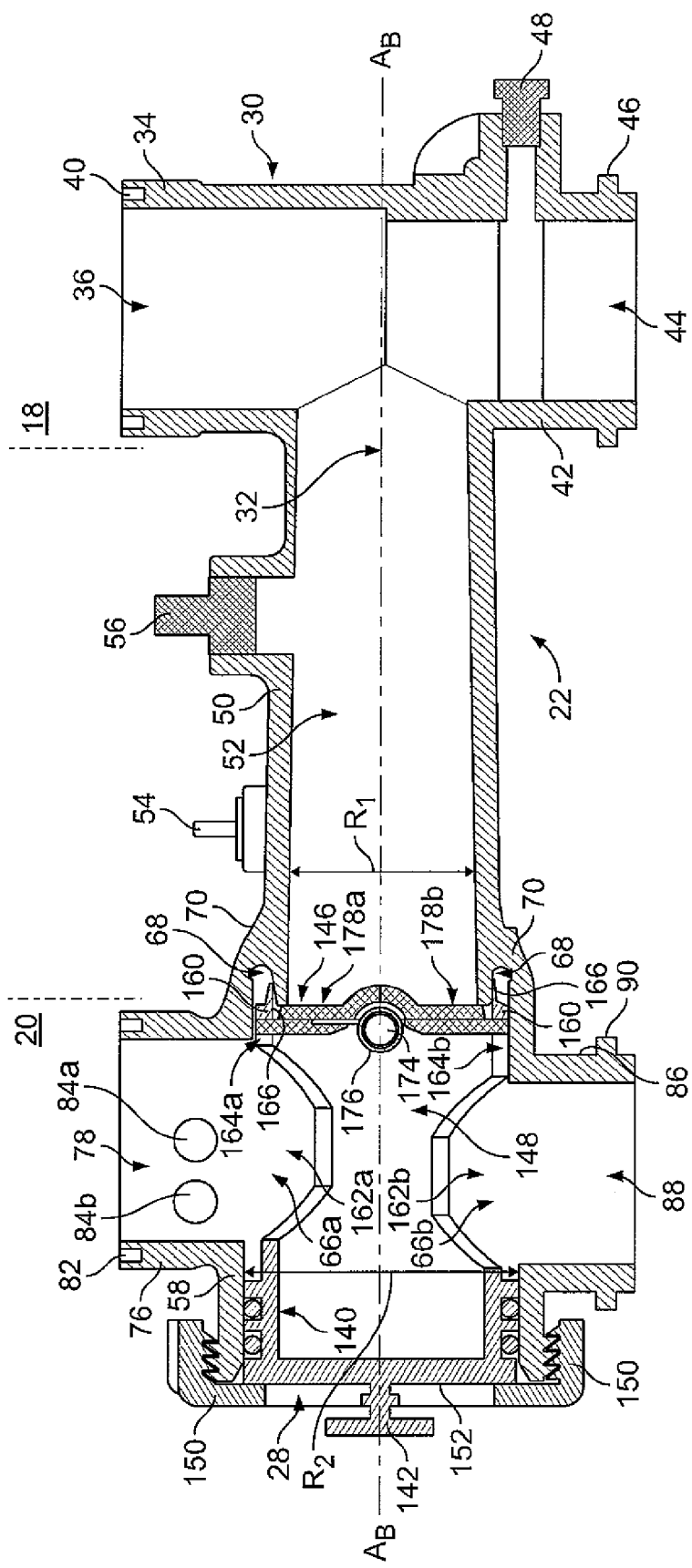
FIG. 6 is a cross-sectional view showing the manifold, the service cartridge assembly, and the lock ring therefor of FIG. 2, the cross-section having been taken along section line 6-6 of FIG. 2.

Referring to FIGS. 5 and 6, the annular housing 58 is, as indicated above, partially concentric with the bypass port 50. In this regard, the annular housing 58 and the bypass port 50 form an annular channel 68 therebetween, and the annular housing 58 includes a tapered section 70 that extends from the bypass port 50 to enclose that side of the annular channel 68 opposite the receiving area 60. Circumferentially-displaced ribs, which are referenced herein as manifold ribs 72a, 72b, are positioned within the annular channel 68 and extend axially from the bypass port 50 to the annular housing 58 to assist in aligning the service cartridge assembly 28 when same is inserted in the receiving area 60. Each one of the manifold ribs 72a, 72b is preferably displaced by about one-hundred and eighty degrees (180°) from each other one of the plurality of manifold ribs 72a, 72b. Additional ribs can be provided in the annular channel 68 to assist in aligning the service cartridge assembly 28, such as that which is shown and designated as a positioning rib 74 in FIG. 5. Each one of the ribs 72a, 72b, 74 preferably extends axially along the annular housing 58 into the receiving area 60. The annular channel 68 and the ribs 72a, 72b, 74 are sized and shaped to mate with the service cartridge assembly 28 and inhibit rotation thereof. As will be discussed below with further detail, the bypass chamber 52 of the bypass port 50 is in fluid communication with the receiving area 60 of the annular housing 58 under certain pressure conditions.

Referring to FIGS. 2-6, at the outflow side 20, the manifold 22 includes a circulation line outlet 76 proximal the outflow opening 66a, wherein the circulation line outlet 76 is shown to be defined by a substantially annular wall extending from the annular housing 58. The circulation line outlet 76 defines therein a first outflow chamber 78 and is provided with external threads 80. An annular groove 82 is formed within the circulation line outlet 76 at a terminus thereof.

A plurality of temperature sensors 84a, 84b are preferably provided in fluid communication with the first outflow chamber 78 and in electrical communication with the electrical control system 16 of FIG. 1 (electrical connection path not shown). The temperature sensor 84a, for example, is configured to sense a temperature of the water in the flow path $F_{OUT2}$ and send a corresponding temperature measurement to the electrical control system 16. Temperature sensor 84b is redundantly provided as a safety measure. Should the water temperature along flow path $F_{OUT2}$ be sensed by temperature sensor 84a and/or temperature sensor 84b as being greater than desired, the electrical control system 16 will deactivate the heat exchanger 14 in response thereto.

The manifold 22 further includes an exchanger line inlet 86 defined by a substantially annular wall extending from the annular housing 58 proximal the outflow opening 66b. The exchanger line inlet 86 defines therein a second outflow chamber 88 and is provided with an annular rim 90 spaced from the terminus of the exchanger line inlet 86 opposite the annular housing 58. Each one of the exchanger line inlet 86, the circulation line outlet 76, the exchanger line outlet 42, and the circulation line inlet 34 preferably has a radius (not designated) substantially equal to that of each other one of the exchanger line inlet 86, the circulation line outlet 76, the exchanger line outlet 42, and the circulation line inlet 34 The exchanger line inlet 86 is slightly offset from the outflow axis $A_{OUT}$.

Figure 3:
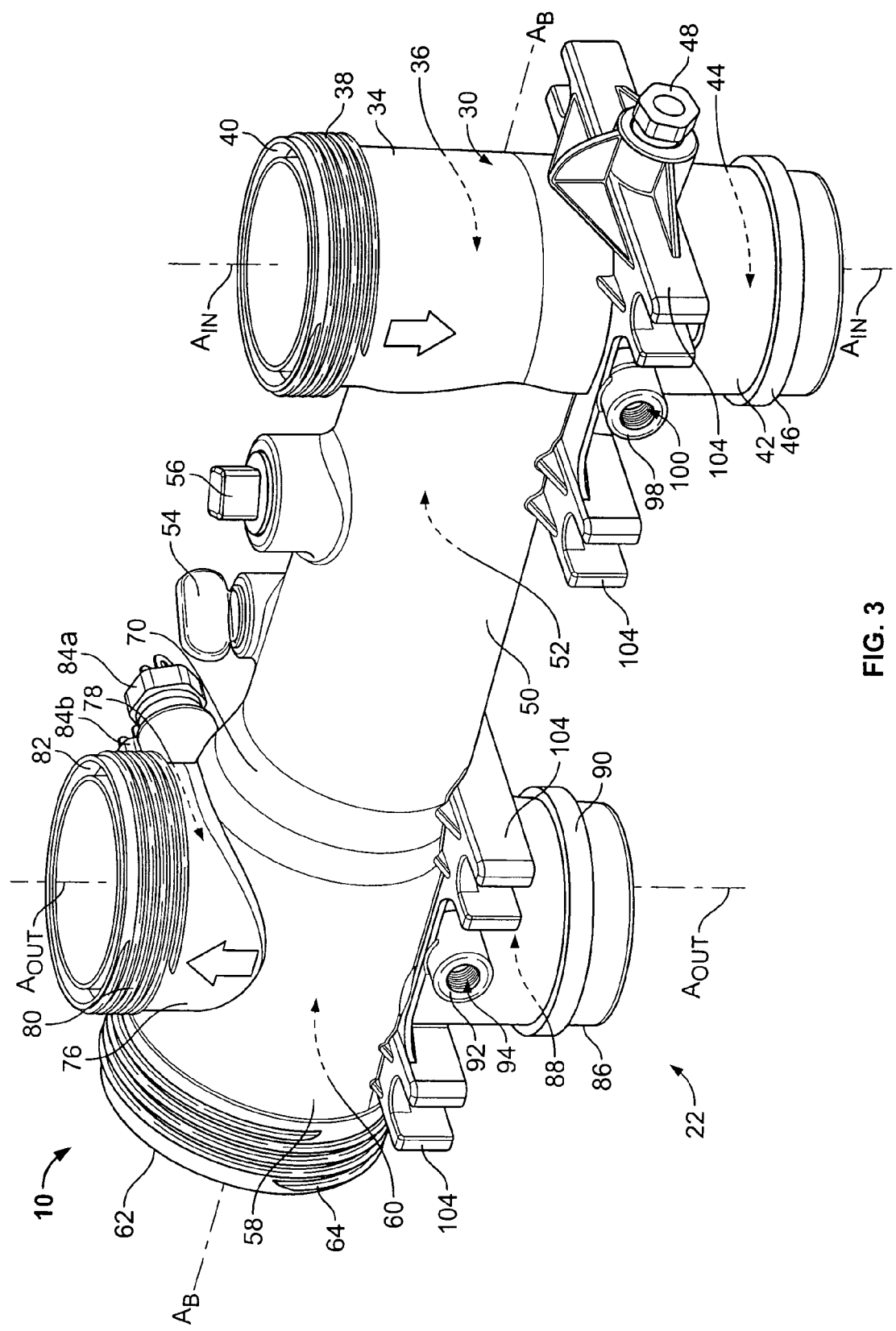
FIG. 3 is a front perspective view showing the manifold of FIG. 2.
Figure 4:
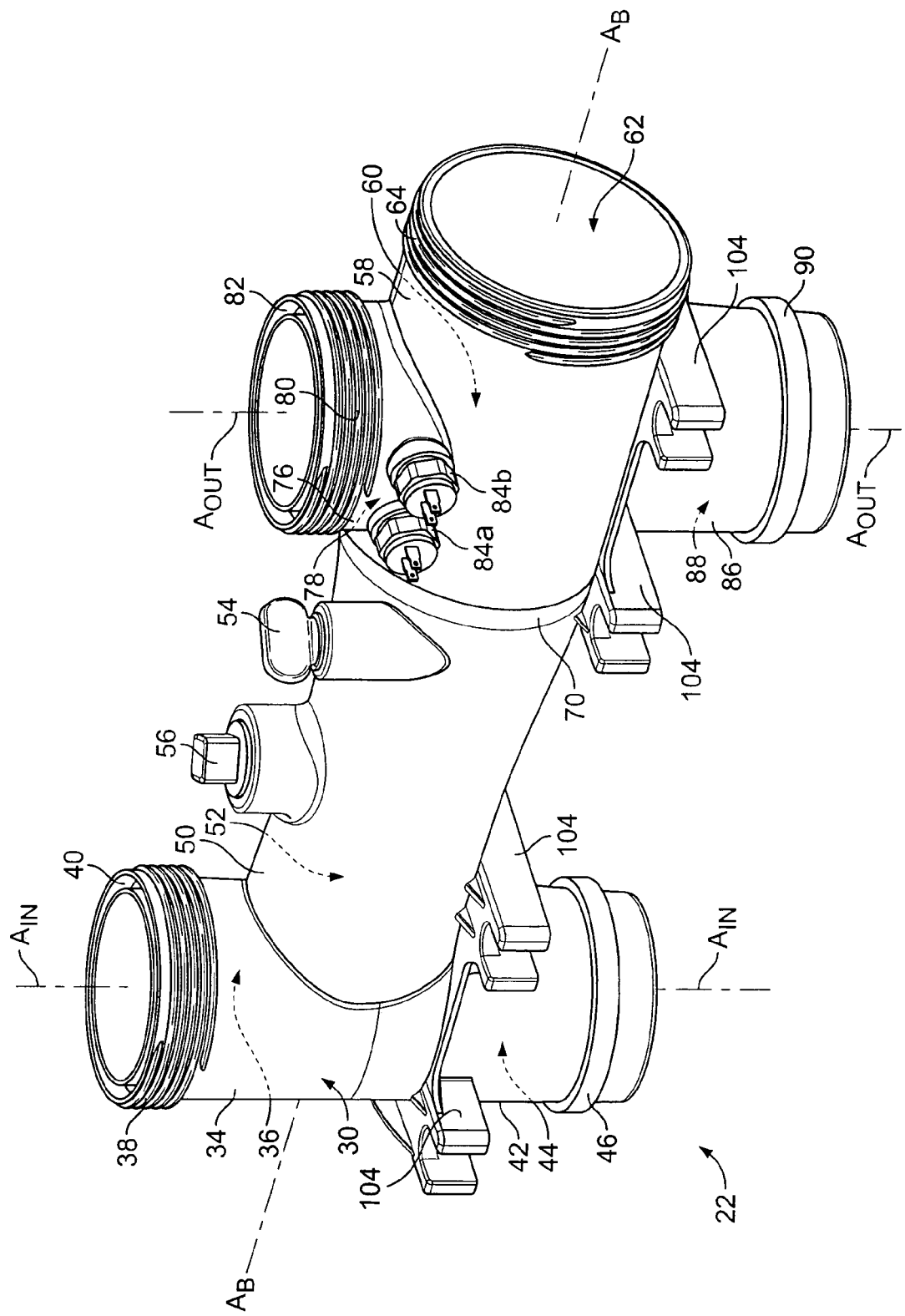
FIG. 4 is a rear perspective view showing the manifold of FIG. 2.

Referring to FIGS. 1 and 3, a port, referenced herein as an outflow pressure port 92, extends from the exchanger line inlet 86 to define a chamber, referenced herein as an outflow sensing chamber 94, that is in fluid communication with the second outflow chamber 88. A pressure sensor, referenced herein as an outflow pressure sensor 96, extends into the outflow pressure port 92 to measure the pressure $P_{OUT}$ of the water along the flow path $F_{OUT1}$. Similarly, on the inflow side 18, a port, referenced herein as an inflow pressure port 98, extends from the exchanger line outlet 42 to define a chamber, referenced herein as an inflow sensing chamber 100, that is in fluid communication with the second inflow chamber 44. A pressure sensor, referenced herein as an inflow pressure sensor 102, extends into the inflow pressure port 98 to measure a pressure $P_{IN}$ of the water along the flow path $F_{IN2}$.

The outflow pressure sensor 96 and the inflow pressure sensor 102 are utilized to have the electrical control system 16 activate and/or deactivate the heat exchanger 14 in accordance with a pressure differential $\Delta P$, e.g., ($P_{IN}$-$P_{OUT}$). This may be accomplished by any suitable electromechanical and/or electronic means known in the art.

For example, as shown in FIG. 1, it is contemplated that the outflow pressure sensor 96 sends the pressure $P_{OUT}$ to the electrical control system 16 and that the inflow pressure sensor 102 sends the pressure $P_{IN}$ to the electrical control system 16, wherein an electronic processor compares (differences) $P_{IN}$ and $P_{OUT}$ to obtain a pressure differential $\Delta P$. In this regard, it is contemplated that the electronic processor retrieves a pressure set point $P_{SP}$ from memory associated therewith, and compares same with the pressure differential to identify if the set point has been reached/exceeded. The measuring and comparison can be done repetitively over time and, in the event that a rising pressure differential $\Delta P$ meets and/or exceeds the pressure set point $P_{SP}$, the electrical control system 16 initiates activation of the heat exchanger. It is preferable that the set point be between about 0.1 pounds per square inch (PSI) and about 5.0 (PSI), and it is more preferable that the set point be between about 0.2 PSI and about 1.5 PSI. Notwithstanding, it is contemplated that any suitable set point can be provided.

As another example, it is contemplated that each one of the pressure sensors 96, 102 are components of a mechanical pressure differential switch (not shown) attached to the pressure ports 92, 98 to directly measure a difference in pressure between the two ports 92, 98. It is contemplated that each one of the sensors 96, 102 can include a movable diaphragm (not shown) responsive to the pressures of the sensing chambers 94, 100, and that a tube (not shown) can be provided to house both diaphragms A shaft (not shown) is secured to both diaphragms, and the diaphragms displace proportionally to the pressure at the respective ports 92, 98. The shaft is spring-loaded in such a manner that it may be calibrated to define a set-point for measuring a particular range of differential pressures. The shaft is connected to an electrical switch, such that the switch contacts are normally open, and the contacts are configured to close if the shaft is displaced an adequate distance relative to the set point of the spring. If both pressures are the same (the condition in which there is no water flow through the heat exchanger), the connecting shaft is stationary, and the switch contacts remain open. If the pressure at the inflow port 98 is higher than the pressure at the outflow port 92 by a predetermined amount, such as about 0.2-0.8 PSI, then the switch contacts close to initiate activation of the heat exchanger 14. If the pressure at the inflow port 98 is less than the pressure at the outflow port 92, such as in a reversed piping scenario, then the switch contacts remain open.

Referring to FIGS. 2-5, the manifold 22 shall now be further discussed. The manifold 22 includes a plurality of outwardly extending finger sets 104 aligned along a shared plane. Each one of the finger sets 104 includes a first finger (not designated), a second finger (not designated), and a passage (not designated) extending therebetween for receiving one of a plurality of bolts 106 to secure the header 10 to the heat exchanger 14. Each one of the bolts 106 can be provided with spacers and/or washers.

The exemplary manifold 22 includes eight finger sets 104, wherein two finger sets 104 extend perpendicularly from the inflow side 18 proximal the exchanger line outlet 42 in a first direction, two finger sets 104 extend perpendicularly from the inflow side 18 proximal the exchanger line outlet 42 in a second direction opposite the first direction, two finger sets 104 extend perpendicularly from the outflow side 20 proximal the exchanger line inlet 86 in the first direction, and two finger sets 104 extend perpendicularly from the outflow side 20 proximal the exchanger line inlet 86 in the second direction.

Continuing with reference to FIG. 2, the circulation line adapter assemblies 24a, 24b of the header 10 are releasably securable to the manifold 22 at the circulation line outlet 76 and the circulation line inlet 34, respectively. The circulation line adapter assemblies 24a, 24b shall now be discussed with exemplary reference to the circulation line adapter assembly 24a. It shall be clear to one skilled in the art that the below discussion of the circulation line adapter 24a is equally applicable to the circulation line adapter 24b.

The circulation line adapter assembly 24a has a seal 108a, a circulation line fitting 110a, and a lock ring 112a. The seal 108a, which is preferably formed from an elastomeric material, is positioned within the annular groove 82 and extends radially therefrom. The line fitting 110a, which is preferably formed from a plastic material, includes an annular wall 114a extending about the outflow axis $A_{OUT}$. The line fitting 110a further includes a flange 116a that extends radially from an end of the annular wall 114a and that abuts the seal 108a. The inner radius (not designated) of the annular wall 114a is substantially equal to the inner radius (not designated) of the circulation line outlet 76, though the outer radius (not designated) of the annular wall 114a is less than the outer radius (not designated) of the circulation line outlet 76. In this regard, the lock ring 112a includes a radially extending section 118a and an internally-threaded section 120a depending therefrom, such that the annular wall 114a extends through the radially extending section 118a of the lock ring 112a, and such that the external threads 80 of the circulation line outlet 76 cooperate with the internally-threaded section 120a of the lock ring 112a to secure the line fitting 98a against the circulation line outlet 76.

Similarly, the circulation line adapter assembly 24b includes a seal 108b, a circulation line fitting 110b, and a lock ring 112b. The seal 108b is positioned within the annular groove 40 and extends radially therefrom. The line fitting 110b includes an annular wall 114b extending about the inflow axis $A_{IN}$ and further includes a flange 116b abutting the seal 108b. The lock ring 112b includes a radially extending section 118b and an internally-threaded section 120b depending therefrom, such that the annular wall 114b extends through the radially extending section 118a of the lock ring 112b, and such that the external threads 38 of the circulation line inlet 34 cooperate with the internally-threaded section 120b of the lock ring 112b to secure the line fitting 110b against the circulation line inlet 34.

Figure 7:
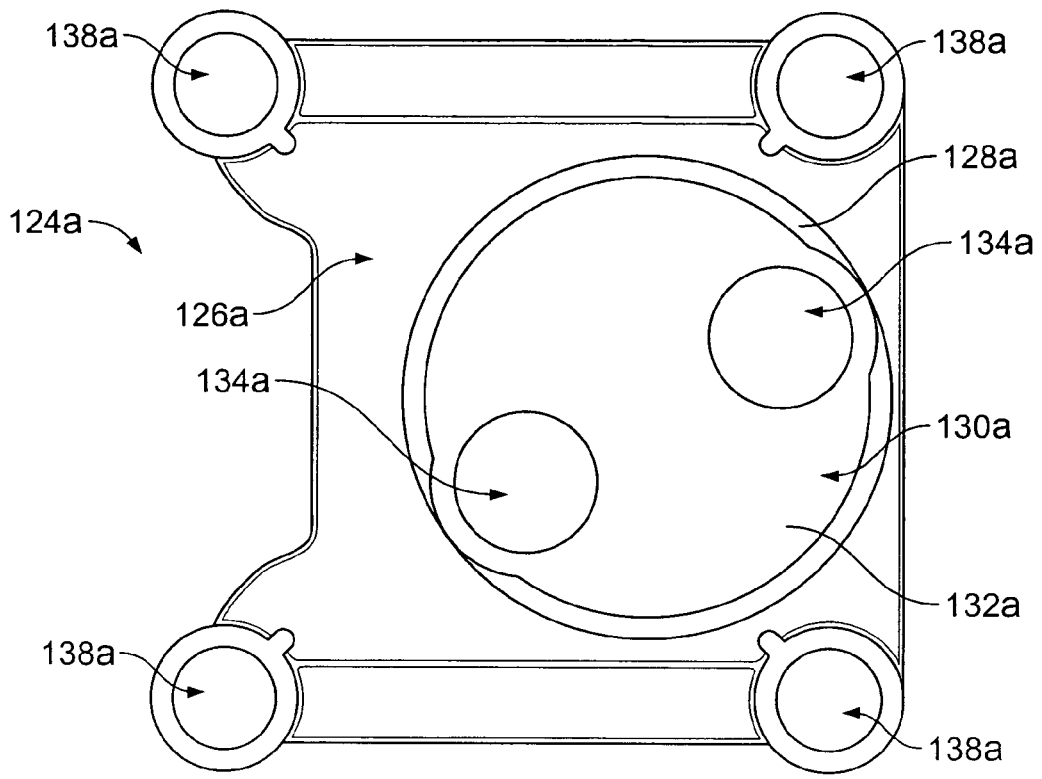
FIG. 7 is a top view showing a base of one of the exchanger line adapter assemblies of FIG. 2.
Figure 8:
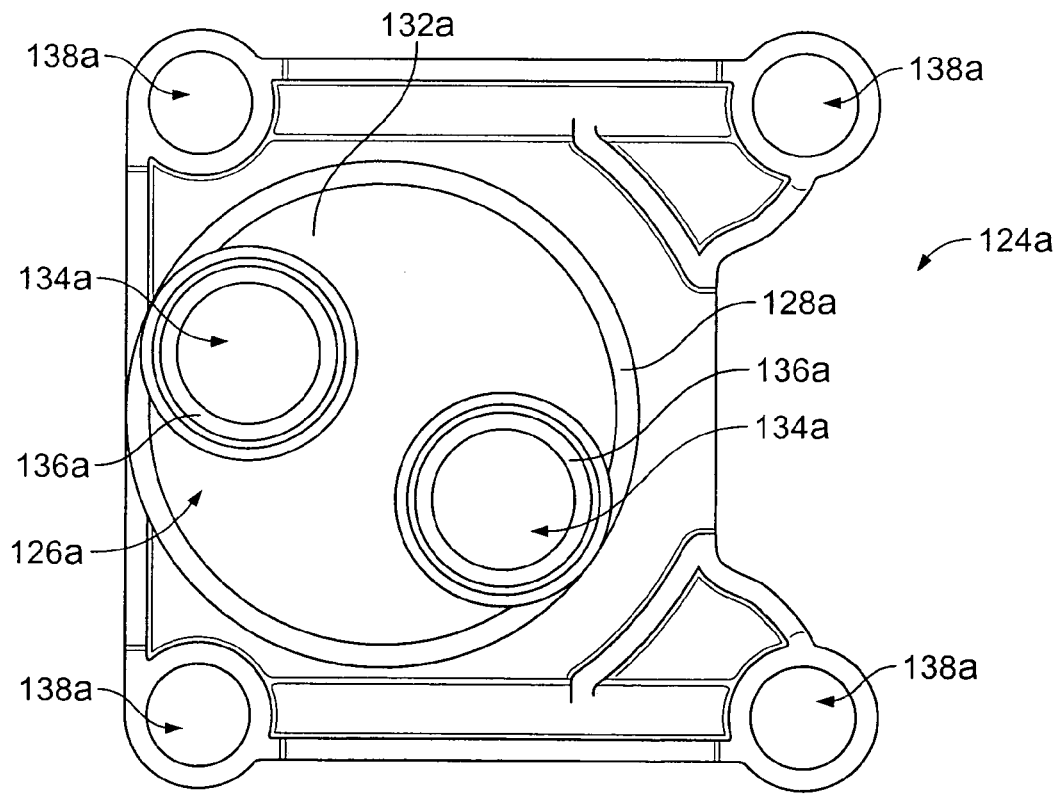
FIG. 8 is a bottom view showing the base of FIG. 7.
Figure 9:
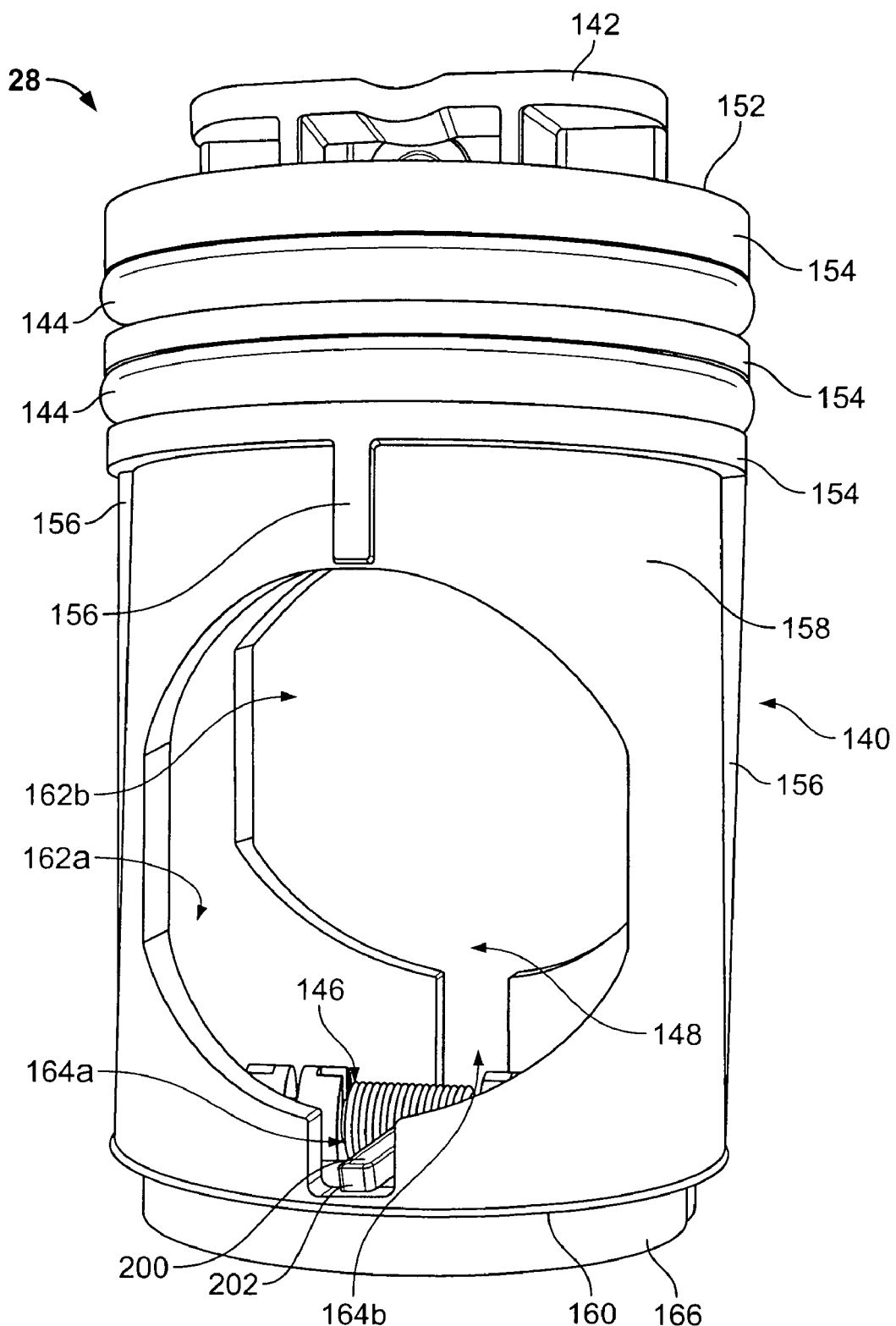
FIG. 9 is a first perspective view showing the service cartridge assembly of FIG. 2, the service cartridge assembly being shown to include a handle, a frame, and a flapper valve.
Figure 10:
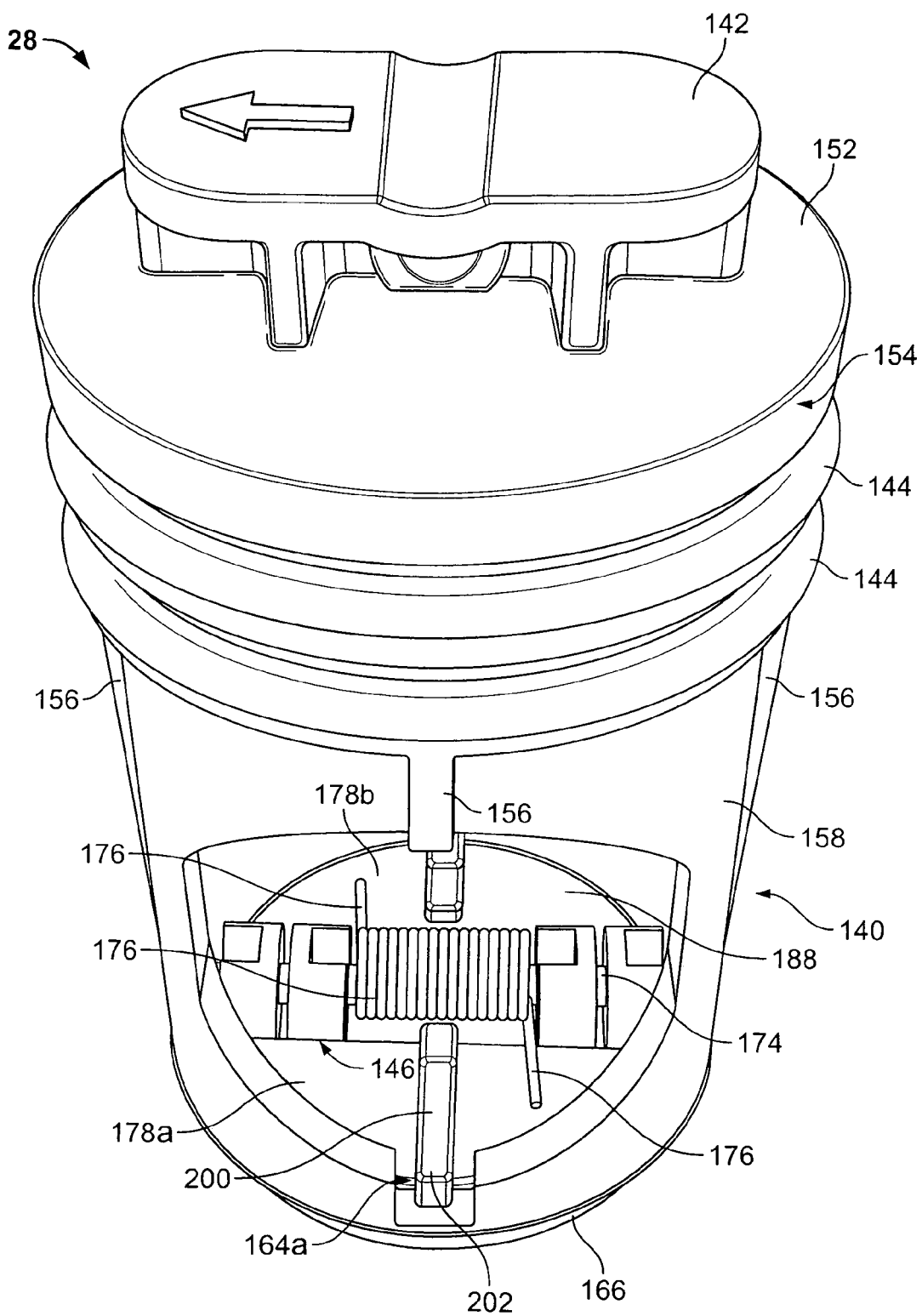
FIG. 10 is a second perspective view showing the service cartridge assembly of FIGS. 2 and 9.
Figure 11:
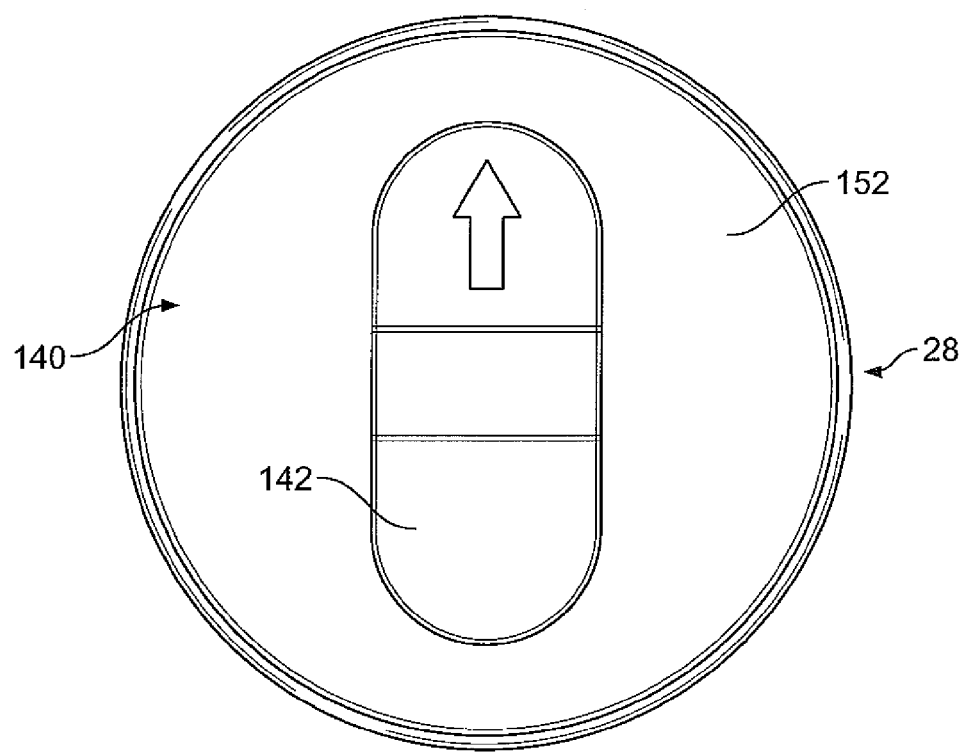
FIG. 11 is a left side elevational view showing the service cartridge assembly of FIGS. 2, 9, and 10.

Referring to FIGS. 2 and 7-8, the exchanger line adapter assemblies 26a, 26b of the header 10 are releasably securable to the manifold 22 at the exchanger line inlet 86 and the exchanger line outlet 42, respectively. As further discussed below, the exchanger line adapter assemblies 26a, 26b include O-rings 122a, 122b, respectively, and bases 124a, 124b, respectively.

The exchanger line adapter assemblies 26a, 26b shall now be discussed with exemplary reference to the exchanger line adapter assembly 26a. It shall be clear to one skilled in the art that the below discussion of the exchanger line adapter assembly 26a is equally applicable to the exchanger line adapter assembly 26b.

The O-ring 122a, which is preferably formed from an elastomeric material, such as rubber, extends circumferentially about the exchanger line inlet 86. The base 122a, which is preferably formed from plastic, includes a tiered-section 126a having a first depression area 128a with a first diameter (not designated) and a second depression area 130a with a second diameter less than the first diameter (not designated). A surface, referenced herein as a seat 132a, extends across a terminus of the second depression area 130a opposite the first depression area 128a. A plurality of openings, referenced herein as exchanger ports 134a, are formed in the seat 132a and each one of a plurality of conduits 136a extend from one of the plurality of exchanger ports 134a.

The base 124a has a plurality of boreholes 138a formed therein for receiving bolts 106 extending from the manifold 22 to securingly retain the base 124a against the manifold 22. When the base 124a is secured to the manifold 22, the first depression area 128a receives the annular rim 90 and the O-ring 122a, while the area extending therefrom to the terminus of the exchanger line inlet 86 is received by the second depression area 130a and abuts the seat 132a.

Referring to FIGS. 2, 6, and 9-12, an exemplary service cartridge assembly 28 of the header 10 shall now be discussed with further detail. The service cartridge assembly 28, which includes a frame 140, a handle 142, a plurality of O-rings 144, and a flapper valve 146, is positioned within the receiving area 60 of the annular housing 58. The service cartridge assembly 28 defines therein a third outflow chamber 148.

An internally-threaded lock ring 150 cooperates with the external threads 64 proximal the service opening 62 to inhibit inadvertent removal of the service cartridge assembly 28 therethrough. When the lock ring 150 is disengaged from the external threads 64 of the service opening 62, the service cartridge assembly 28 is removable for servicing and/or replacement of the service cartridge assembly 28 and/or the components thereof, e.g., the flapper valve 146, etc.

The frame 142 of the service cartridge assembly 28 includes a circular wall 152 aligned along the bypass axis $A_B$, and the handle 142 extends from the circular wall 152 in a direction opposite the receiving area 60. The frame 142 further includes a grooved annulus 154 extending perpendicularly from the circular wall 152 into the receiving area 60. To effect a seal between the service cartridge assembly 28 and the annular housing 58, the outer radius of the grooved annulus 154 is just less than the inner radius $R_2$ of the annular housing 58, and each one of the plurality of O-rings 144 are positioned within each one of the annular grooves (not designated) of the grooved annulus 154.

A plurality of ribs, which are referenced herein as cartridge ribs 156, are circumferentially displaced along a side of the grooved annulus 154 opposite the handle 142 and extend perpendicularly from the grooved annulus 154. A generally cylindrical wall is provided with a slight tapering, which is referenced herein as a tapered wall 158. The tapered wall 158 is at least partially bound by the cartridge ribs 156 and extends from the grooved annulus 154 to an annular lip 160 defining a third opening in the frame 142, referenced has a valve opening (not designated). The tapered wall 158 is tapered toward the grooved annulus, such that the tapered wall 158 has a greater outer radius proximal the annular lip 160 and a lesser outer radius proximal the grooved annulus 154.

A first hole 162a is formed in the tapered wall 158 proximal the outflow opening 66a in the manifold 22, such that the third outflow chamber 148 is in fluid communication with the first outflow chamber 78 of the circulation line outlet 76. Similarly, a second hole 162b is formed in the tapered wall 158 proximal the outflow opening 66b in the manifold 22, such that the third outflow chamber 148 is in fluid communication with the second outflow chamber 88 of the exchanger line inlet 86.

The tapered wall 158 has a plurality of rectangular channels 164a, 164b formed therein that extend from the annular lip 160 to the first and second holes 162a, 164b, respectively. The rectangular channels 164a, 164b are preferably circumferentially-displaced about the tapered wall 158 by about one hundred and eighty degrees (180°). As will be discussed with further detail below, the rectangular channels 164a, 164b assist in securing the flapper valve 146 to the frame 140.

Figure 12:
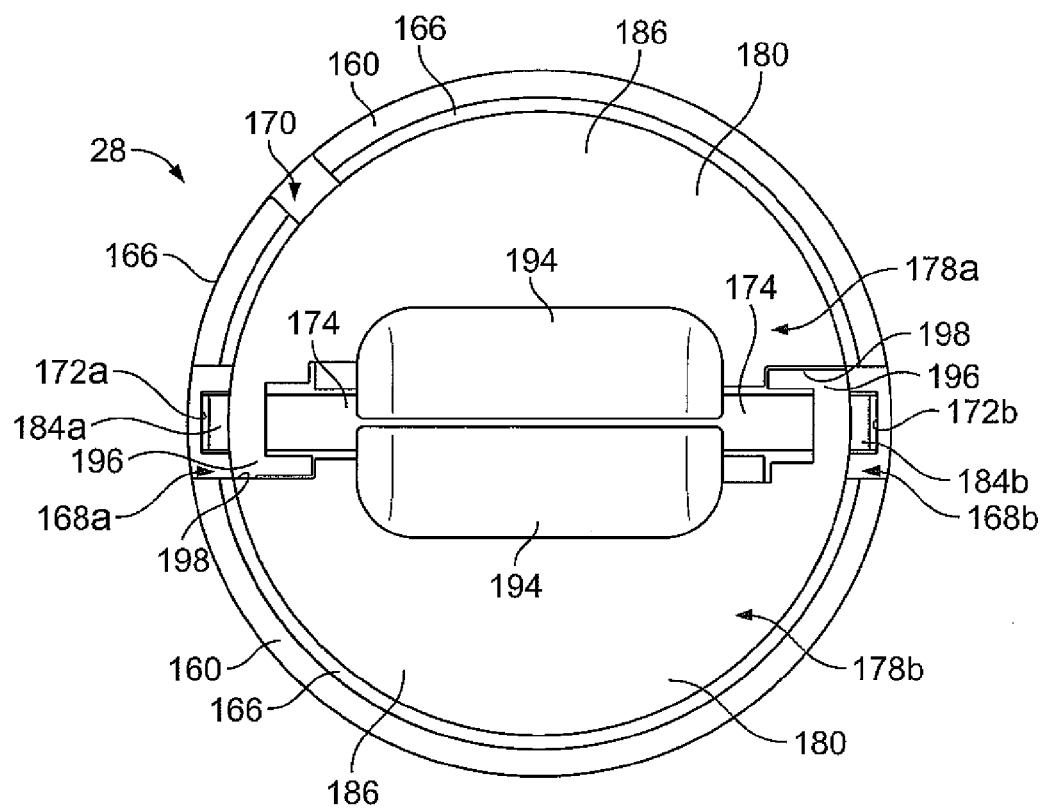
FIG. 12 is a right side elevational view showing the service cartridge assembly of FIGS. 2 and 9-11 with the flapper valve being shown.
Figure 13:
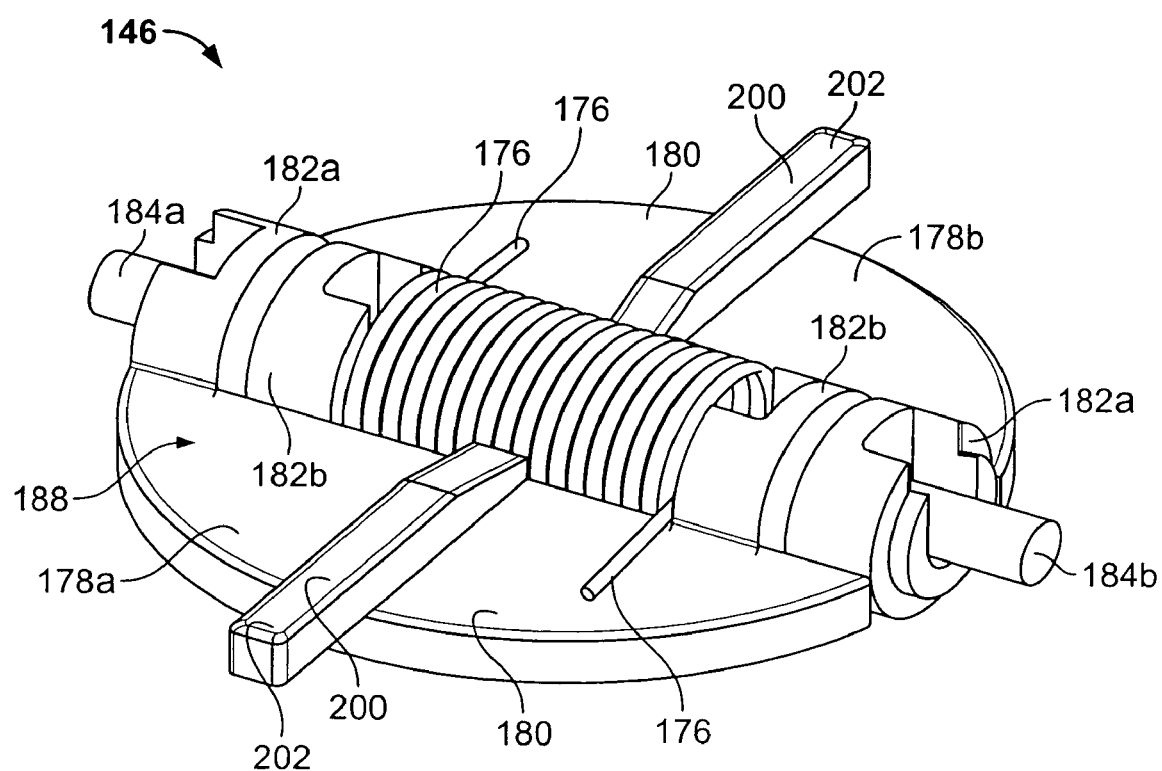
FIG. 13 is a perspective view showing the flapper valve of FIGS. 9, 10, and 12, the flapper valve being shown to include a torsion spring, a shaft, and a plurality of flappers.
Figure 14:
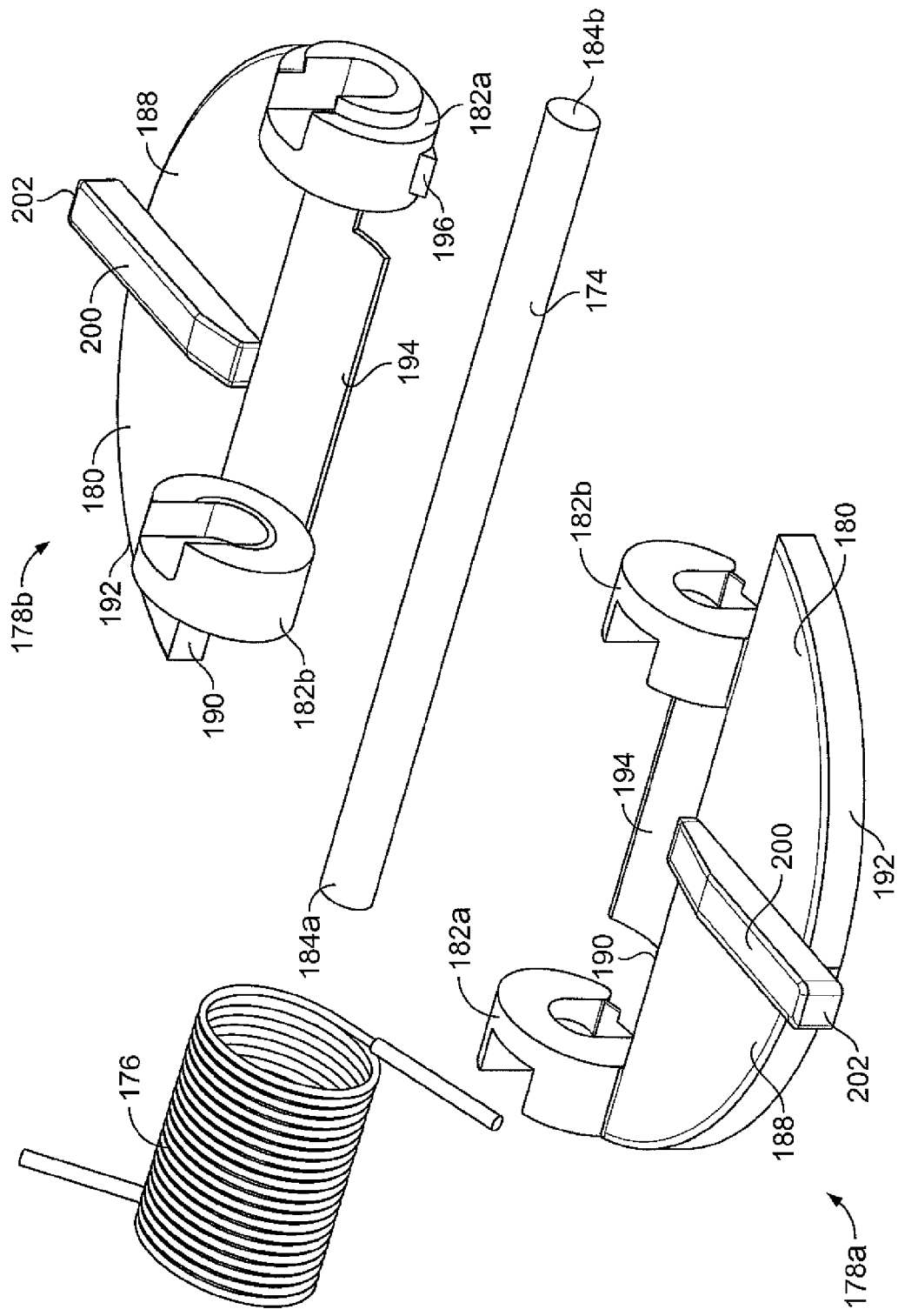
FIG. 14 is an exploded perspective view showing the torsion spring, the shaft, and the plurality of flappers of FIG. 13.
Figure 15:
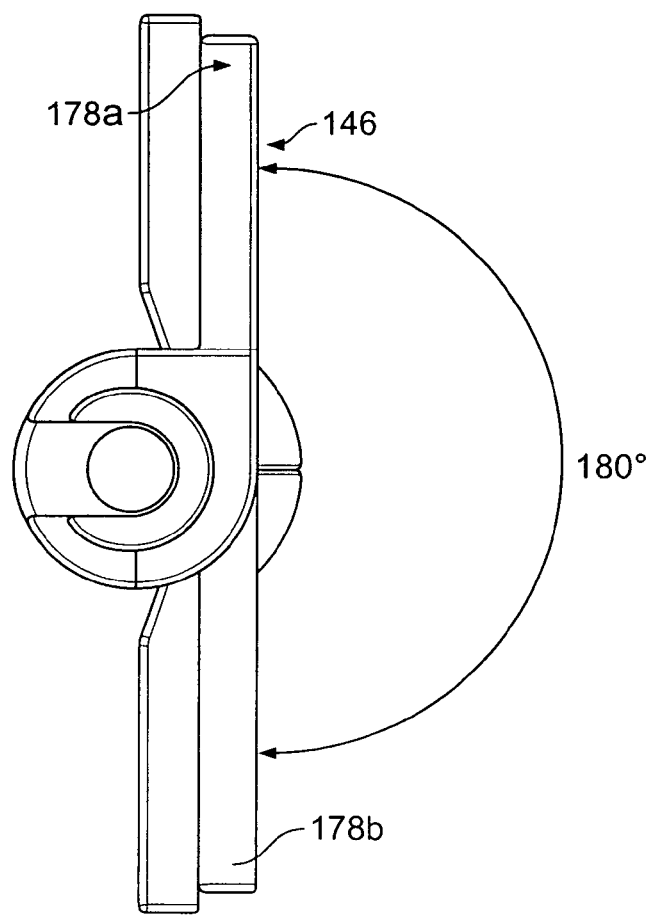
FIG. 15 is a front elevational view showing an exemplary flapper valve in a closed position.

Referring to FIGS. 5 and 12, a notched flange 166 extends axially from an inner circumference of the annular lip 160 and mates with the annular channel 68 formed at the juncture of the housing 58 and the bypass port 50. More particularly, the notched flange 166 includes a plurality of notches 168a, 168b that extend through the annular lip 160 and that are sized and dimensioned to mate with the manifold ribs 72a, 72b to inhibit rotation of the service cartridge assembly 28. The notches 168a, 168b are preferably circumferentially-displaced by about one hundred and eighty degrees (180°) to correspond with the manifold ribs 72a, 72b. The notched flange 166 preferably further includes a positioning notch 170 mating with the positioning rib 74. The positioning notch 170 and the positioning rib 74 cooperate to ensure that the service cartridge assembly has been inserted into the receiving area 60 in the desired spatial orientation.

Referring to FIG. 12, a shoulder 172a is formed in the tapered wall 158 adjacent the notch 168a and proximal the annular lip 160. Similarly, a shoulder 172b is formed in the tapered wall 158 adjacent the notch 168b and proximal the annular lip. Each one of the shoulders 172a, 172b is preferably circumferentially-displaced about the tapered wall 158 from each other one of the shoulders 172a, 172b by about one hundred and eighty degrees (180°). Also, each one of the shoulders 172a, 172b is preferably circumferentially-displaced about the tapered wall 158 from each one of the rectangular channels 164a, 164b adjacent thereto by about ninety degrees (90°). As will be discussed with further detail below, the shoulders 172a, 172b assist in securing the flapper valve 146 to the frame 140.

Referring to FIGS. 6, 9, 10, and 12-15, the flapper valve 146 preferably includes a shaft 174, a torsion spring 176, and a plurality of hinged pieces, which are referenced herein as flappers 178a, 178b. The flappers 178a, 178b shall be discussed with exemplary reference to the flapper 178a. It shall be clear to one skilled in the art, however, that discussion below of the flapper 178a is equally applicable to the flapper 178b.

The flapper 178a, which is preferably formed from polypropylene, includes a semicircular portion 180 and a plurality of hinges 182a, 182b extending from the semicircular portion 180. Each one of the hinges has formed in a first side thereof a first U-shaped channel (not designated) and, in a second side opposite the first side, a second U-shaped channel (not designated) that is inverted with respect to the first U-shaped channel. The shaft 174 extends through the hinges 182a, 182b and extends through a central space (not designated) of the torsion spring 176.

Referring to FIGS. 5 and 12, the shaft has a first end 184a positioned within the shoulder 172a of the frame 140 and a second end 184b positioned within the shoulder 174b of the frame 140. The manifold ribs 72, 72b of the housing 58 extend into the notches 168a, 168b, which thereby secures the ends 184a, 184b in the shoulders 174a, 174b, respectively. The shaft is preferably formed from type 316 stainless steel. In this regard, the torsion spring 176 is preferably formed from type 316 stainless steel spring wire.

Referring to FIGS. 6 and 12-14, the flapper 178a includes a first side 186 facing the bypass chamber 52, a second side 188 facing the third outflow chamber 148, a straight edge 190 that is substantially parallel with respect to the shaft 174, and a curved edge 192 that is proximal the frame 14. The flapper 178a further includes a curved extension 194 extending from the first side 186 at the straight edge 190. The curved extension 194 of the flapper 178a and the curved extension 194 of the flapper 178b cooperate to receive the torsion spring 176. When the flapper valve is in a closed position, the curved extensions 194 abut one another at ends thereof to inhibit reverse rotation of the flappers 178a, 178b. Furthermore, referring to FIG. 12, the flapper 178a preferably includes a stop 196 and a stop surface 198 complementary thereto, such that, when the flapper valve 146 is in the closed position, the stop 196 of the flapper 178a abuts the stop surface 198 of the flapper 178b and the stop 196 of the flapper 178b abuts the stop surface 198 of the flapper 178 to inhibit reverse rotation of the flappers.

Referring to FIGS. 6 and 9-14, the flapper 178a includes a protrusion 200 extending from the second side 188 that is aligned with an imaginary bisector thereof. As shown, the protrusion 200 includes a beveled edge (not designated), such that the beveled edges of the flappers 178a, 178b make contact at a fully-open position of the flapper valve 146. The protrusion 200 begins proximal the straight edge 190 and extends past the boundary of the curved edge 192, such that an end of the protrusion 200, referenced herein as the protrusion end 202, is spaced apart from the semicircular portion 180. In this regard, when the flapper valve is in the closed position, the protrusion end 202 of the flapper 178a is positioned within the rectangular channel 164a of the frame 140 and the protrusion end 202 of the flapper 178a is positioned within the rectangular channel 164b. In this regard, in the closed position of the flapper valve 146, the torsion spring 176 has a rotational force applied to the flappers 178a, 178b, such that the protrusion end 202 of each one of the flappers is secured within the corresponding one of the channels 164a, 164b.

Referring to FIGS. 1, 6, 12, 13, and 15, which show the flapper valve 146 in a closed position, the flapper 178a is angularly displaced from the flapper 178b by about one-hundred and eighty degrees (180°), thereby obstructing fluid flow from the bypass chamber 52 to the third outflow chamber 148 along the flow path $F_B$.

Figure 16:
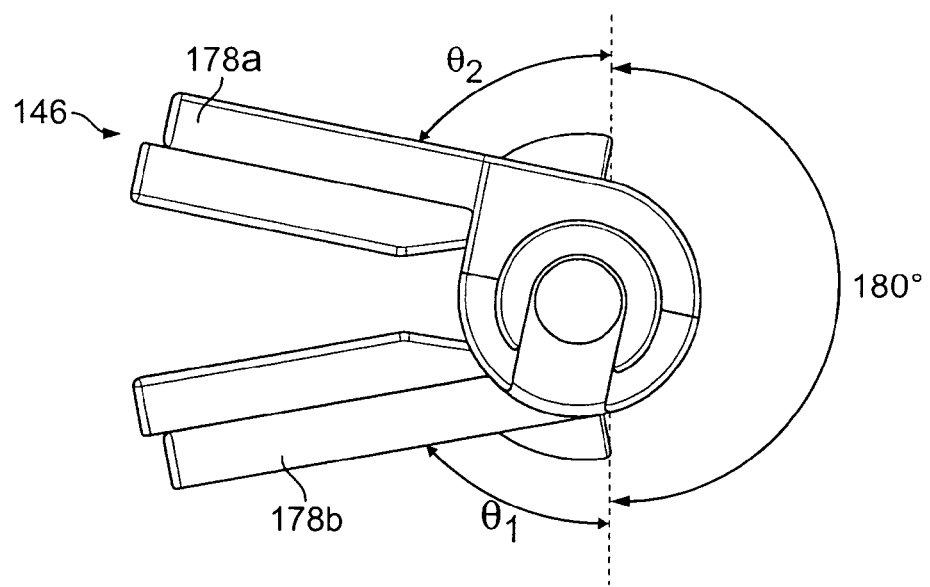
FIG. 16 is a front elevational view showing an exemplary flapper valve in an open position.

However, as shown in FIG. 16, when a high-pressure condition exists in the bypass chamber 52, the flapper 178a is angularly displaced, thereby permitting fluid flow from the bypass chamber 52 to flow to the third outflow chamber 148 along the flow path $F_B$. In the open positions, the flapper 178b is angularly displaced from the closed position by as much as an angle $\theta_1$, which is preferably about fifty degrees (50°), and the flapper 178a is angularly displaced from the closed position by an angle $\theta_2$, which is preferably also about fifty degrees (50°), for a preferred maximum displacement of two-hundred and eighty-degrees (280°). Thus, when the angular displacement between the flapper 178a and the flapper 178b is greater than one-hundred and eighty degrees (180°), water can flow from the bypass chamber 52 to the third outflow chamber 148 along the flow path $F_B$.

The flapper valve 146 is releasably securable to the frame 140. For example, when the flapper valve 146 is secured to the frame 140 within the manifold 22, the service cartridge assembly 28 is removed therefrom by a user, who then rotates the flapper valve 146 into an open position, such that the protuberance ends 202 have moved out of the channels 164a, 164b, through the holes 162a, 162b, and into the third inflow chamber 148. The flapper valve 146 is then pulled in a direction opposite the circular wall 152 through the valve opening defined by the annular lip 160 of the frame 140. Similarly, to install the flapper valve 146, a user rotates the flapper valve into an open position, inserts the shaft ends 184a, 184b into the shoulders 172, 172b and then releases the flapper valve, allowing the protuberance ends 202 to move in response to the force of the torsion spring 176 into the channels 164a, 164b.

Figure 17:
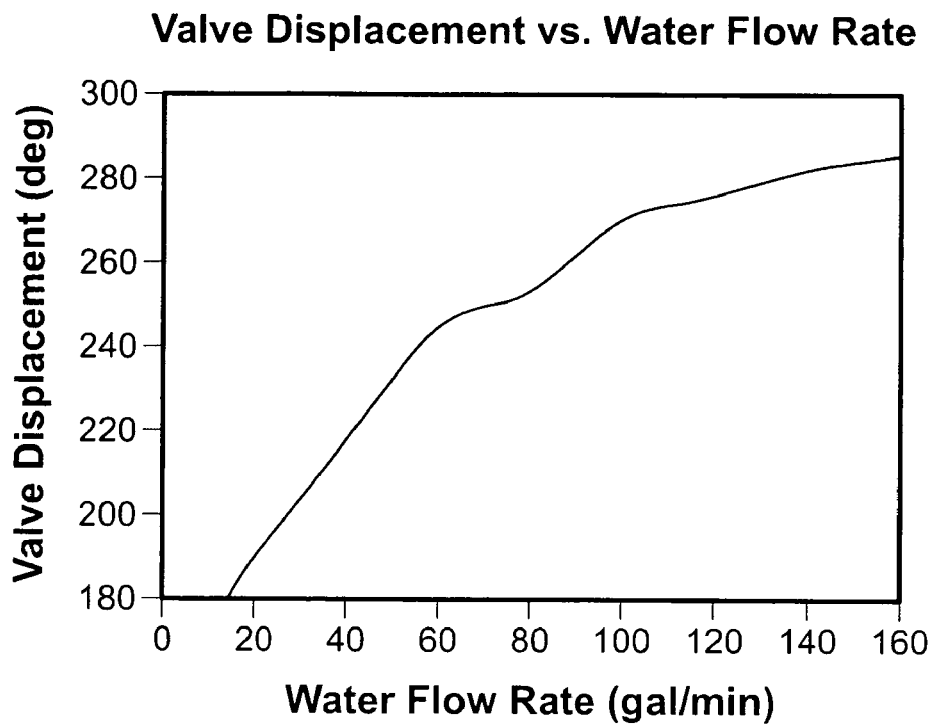
FIG. 17 is a table showing valve displacement as a function of water flow rate for the header of FIG. 1.

Referring to FIG. 17, the total angular displacement between the flappers 178a, 178b is a function of the water flow rate on flow paths $F_{IN1}$ and/or $F_{IN2}$. As water flow is increased, the flapper valve 146 opens proportionally to allow more water to bypass those heat exchanger tubes proximal the exchanger line outlet 42, keeping the water flow rate through the heat exchanger 10 at the optimum flow rate.

Figure 18:
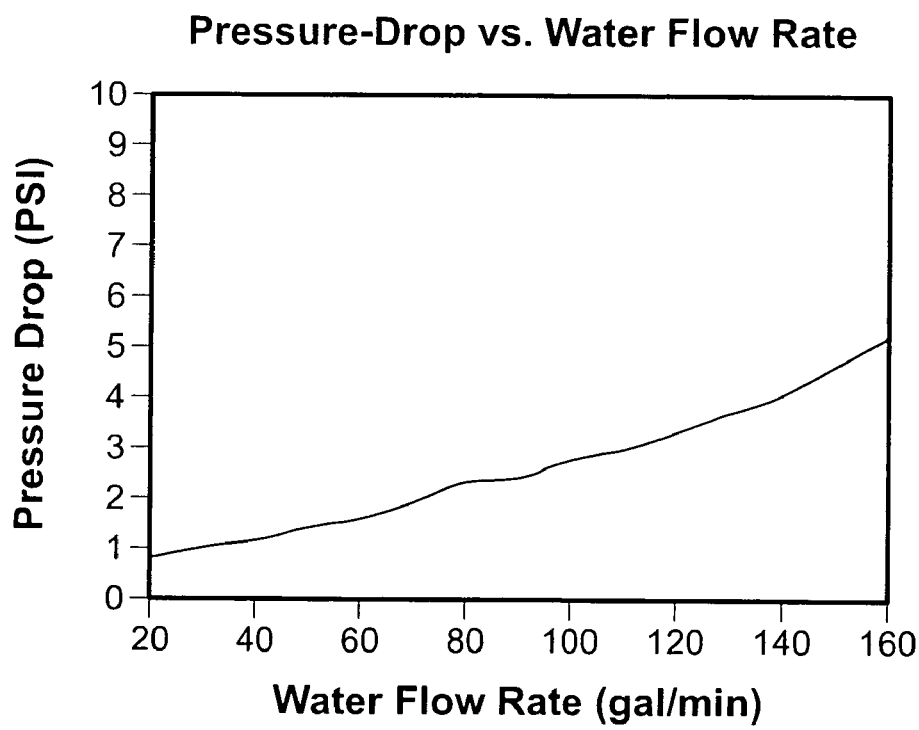
FIG. 18 is a table showing pressure drop as a function of water flow rate for the header of FIG. 1, where said pressure drop was measured between a circulation line inlet of the header and a circulation line outlet of the header.
Figure 19:
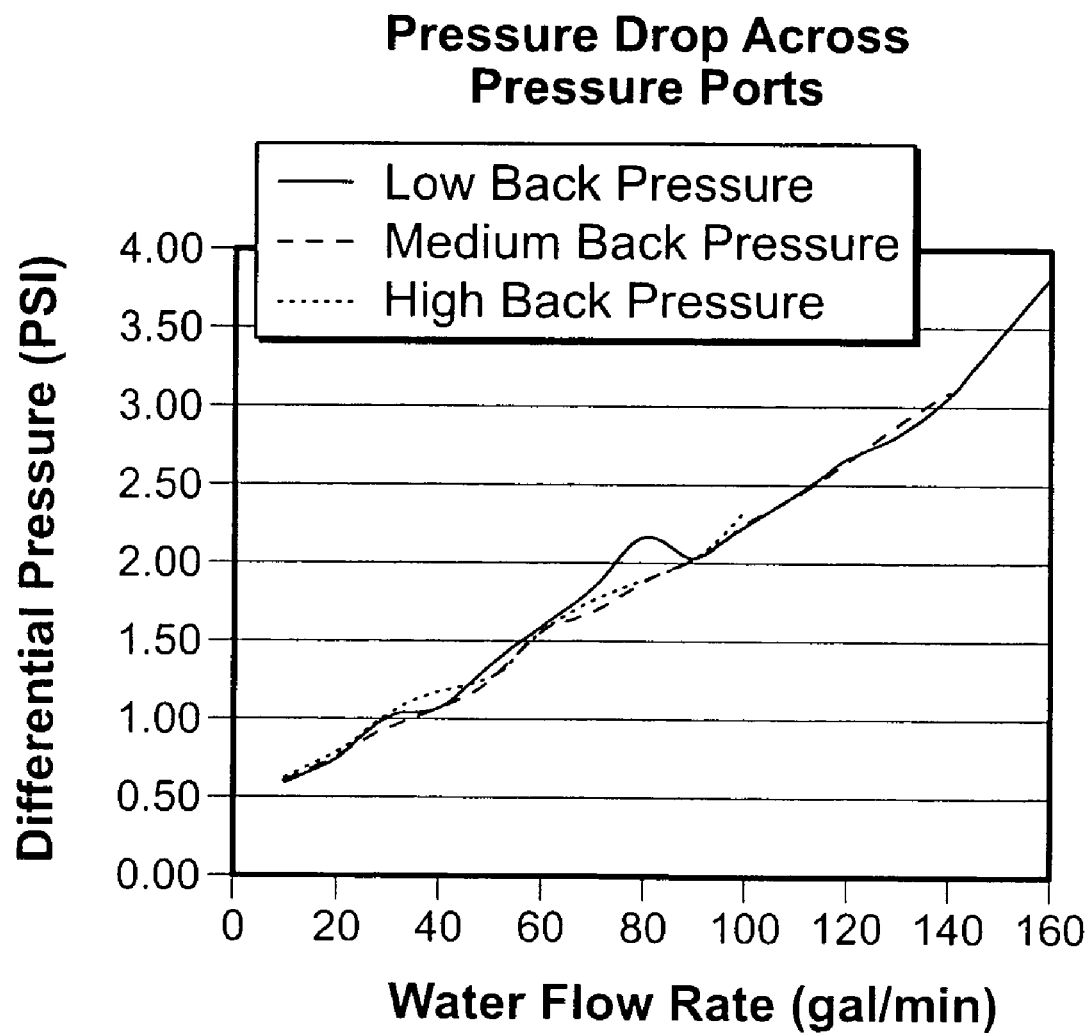
FIG. 19 is a table showing differential pressure as a function of water flow rate for the header of FIG. 1, where said differential pressure was measured between an exchanger line outlet of the header and an exchanger line inlet of the header.

Referring to FIGS. 18 and 19, exemplary embodiments of the header 10 provide enhanced optimization of water flow rate through the heat exchanger 14 and minimize the differential pressure, also known as "pressure drop", across the heat exchanger 14. By reducing the pressure drop associated with the heat exchanger 14, the header 10 enables a higher total water flow rate in a pool and/or spa system to be provided with a smaller circulation pump. Furthermore, as shown in FIG. 19, the differential pressure appears to have minimal deviation when the "back pressure" (pressure in the bypass chamber 52) varies from a low pressure, such as about two (2) PSI, to a medium pressure, such as about ten (10) PSI, and to a high pressure, such as about forty (40) PSI.

It shall be understood that the embodiments of the present invention described herein are merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A service cartridge assembly for a header of a heat exchanger, comprising a frame defining a chamber therein, said frame having formed therein a first hole adjacent said chamber for allowing fluid flow therethrough into said chamber from an exchanger line inlet, a second hole adjacent said chamber for allowing fluid flow therethrough from said chamber to a circulation line outlet, and a third hole adjacent said chamber; and a flapper valve releasably securable to said frame proximal said third hole, said flapper valve, when releasably secured to said frame proximal said third hole, being movable between a closed position, in which said flapper valve obstructs fluid flow through third hole into said chamber from an inflow side, and an at least partially open position, in which said flapper valve allows fluid flow through said third hole into said chamber from the inflow side.

2. The service cartridge assembly of claim 1, wherein said frame includes an annular lip defining therein said third hole, wherein said frame defines therein a plurality of shoulders proximal said annular lip opposite said chamber and a plurality of channels proximal said annular lip adjacent said chamber, said flapper valve including a plurality of protuberances received by said channels and a plurality of ends received by said shoulders to releasably secure said flapper valve to said frame.

3. The service cartridge assembly of claim 2, including a substantially cylindrical wall extending from said annular lip and defining said first and second holes, a grooved annulus extending from said substantially cylindrical wall, and a wall having a handle and extending from said grooved annulus.

4. The service cartridge assembly of claim 1, wherein said flapper valve includes a first flapper, a second flapper, and means applying a rotational force to said first and second flappers into said closed position of said flapper valve, each of said first and second flappers, when said flapper valve is in said closed position, being angularly displaced from another of said first and second flappers by a first angular amount, and each of said first and second flappers, when said flapper valve is in said at least partially open position, being angularly displaced from another of said first and second flappers by a second angular amount greater than said first angular amount.

5. The service cartridge assembly of claim 4, wherein said flapper valve includes a shaft, and wherein each of said first and second flappers includes a substantially semi-circular portion and a hinge securing said substantially semi-circular portion about said shaft.

6. The service cartridge assembly of claim 4 in combination with a manifold, wherein said manifold defines a chamber therein receiving said service cartridge assembly, and wherein said frame is configured to mate with said manifold so as to inhibit rotational motion of said frame.

7. The combination of claim 6 in further combination with a lock ring configured to secure said service cartridge assembly within said chamber of said manifold.

8. A service cartridge assembly for a header of a heat exchanger, comprising a frame defining a chamber, said frame having a first hole adjacent said chamber for allowing fluid flow therethrough into said chamber from an exchanger line inlet, a second hole adjacent said chamber for allowing fluid flow therethrough from said chamber to a circulation line outlet, and a third hole adjacent said chamber; and a flapper valve at said frame proximal said third hole, said flapper valve movable between a closed position, in which said flapper valve obstructs fluid flow through said third hole into said chamber, and an at least partially open position, in which said flapper valve allows fluid flow through said third hole into said chamber.

9. The service cartridge assembly of claim 8 wherein said flapper valve is releasably secured to said frame.

10. The service cartridge assembly of claim 9, wherein said frame includes a plurality of shoulders and a plurality of channels, said flapper valve including a plurality of protuberances received by said channels and a plurality of ends received by said shoulders.

11. The service cartridge assembly of claim 10, including a handle.

12. The service cartridge assembly of claim 8, wherein said flapper valve includes a first flapper, a second flapper, and means applying a rotational force to said first and second flappers into said closed position of said flapper valve, each of said first and second flappers, when said flapper valve is in said closed position, being angularly displaced from another of said first and second flappers by a first angular amount, and each of said first and second flappers, when said flapper valve is in said at least partially open position, being angularly displaced from another of said first and second flappers by a second angular amount greater than said first angular amount.

13. The service cartridge assembly of claim 12, wherein said flapper valve includes a shaft, and wherein each of said first and second flappers includes a substantially semicircular portion and a hinge securing said substantially semi-circular portion about said shaft.

14. The service cartridge assembly of claim 12 in combination with a manifold, wherein said manifold defines a chamber therein for receiving said frame, and wherein said frame is configured to mate with said manifold so as to inhibit rotational motion of said frame.

15. The combination of claim 14 in further combination with a lock ring configured to secure said service cartridge assembly within said chamber of said manifold.

16. The service cartridge assembly of claim 8, wherein said flapper valve is angularly displaceable.

17. The service cartridge assembly of claim 16, wherein said frame includes an annular lip defining therein said third hole, wherein said frame defines therein a plurality of shoulders proximal said annular lip opposite said chamber and a plurality of channels proximal said annular lip adjacent said chamber, said flapper valve including a plurality of protuberances received by said channels and a plurality of ends received by said shoulders to releasably secure said flapper valve to said frame.

18. The service cartridge assembly of claim 17, including a substantially cylindrical wall extending from said annular lip and defining said first and second holes, a grooved annulus extending from said substantially cylindrical wall, and a wall having a handle and extending from said grooved annulus.

19. The service cartridge assembly of claim 16, wherein said flapper valve includes a first flapper, a second flapper, and means applying a rotational force to said first and second flappers into said closed position of said flapper valve, each of said first and second flappers, when said flapper valve is in said closed position, being angularly displaced from another of said first and second flappers by a first angular amount, and each of said first and second flappers, when said flapper valve is in said at least partially open position, being angularly displaced from another of said first and second flappers by a second angular amount greater than said first angular amount.

20. The service cartridge assembly of claim 19, wherein said flapper valve includes a shaft, and wherein each of said first and second flappers includes a substantially semi-circular portion and a hinge securing said substantially semi-circular portion about said shaft.

21. The service cartridge assembly of claim 19 in combination with a manifold, wherein said manifold defines a chamber therein for receiving said frame, and wherein said frame is configured to mate with said manifold so as to inhibit rotational motion of said frame.

22. The combination of claim 21 in further combination with a lock ring configured to secure said service cartridge assembly within said chamber of said manifold.

* * * * *